(12) United States Patent
Reddy et al.

(10) Patent No.: US 9,690,668 B2
(45) Date of Patent: Jun. 27, 2017

(54) DATA BOUNDARY IDENTIFICATION

(75) Inventors: Chandra Reddy, South Setauket, NY (US); Pratap Karonde, Ronkonkoma, NY (US); Prashant Parikh, Holtsville, NY (US)

(73) Assignee: CA, Inc., New York, NY (US)

( * ) Notice: Subject to any disclaimer, the term of this patent is extended or adjusted under 35 U.S.C. 154(b) by 620 days.

(21) Appl. No.: 12/130,517

(22) Filed: May 30, 2008

(65) Prior Publication Data

US 2009/0228522 A1    Sep. 10, 2009

Related U.S. Application Data

(60) Provisional application No. 61/033,920, filed on Mar. 5, 2008.

(51) Int. Cl.
*G06F 7/00* (2006.01)
*G06F 17/30* (2006.01)
*G06F 11/14* (2006.01)

(52) U.S. Cl.
CPC .... *G06F 11/1453* (2013.01); *G06F 17/30153* (2013.01)

(58) Field of Classification Search
CPC .............. G06F 17/3045; G06F 17/30159
See application file for complete search history.

(56) References Cited

U.S. PATENT DOCUMENTS

| | | | | |
|---|---|---|---|---|
| 5,778,395 A | * | 7/1998 | Whiting | G06F 11/1464 |
| 5,909,435 A | * | 6/1999 | Apelewicz | H04L 27/18 |
| | | | | 370/320 |
| 6,615,225 B1 | | 9/2003 | Cannon et al. | |
| 6,704,730 B2 | | 3/2004 | Moulton et al. | |
| 6,785,786 B1 | | 8/2004 | Gold et al. | |
| 6,799,206 B1 | | 9/2004 | Workman et al. | |
| 7,117,533 B1 | * | 10/2006 | Libenzi | H04L 63/0236 |
| | | | | 709/206 |
| 7,386,627 B1 | * | 6/2008 | Lango | H04L 65/605 |
| | | | | 709/231 |
| 7,707,425 B2 | * | 4/2010 | Mihcak | G06F 17/30026 |
| | | | | 382/100 |
| 7,778,972 B1 | * | 8/2010 | Cormie | G06F 17/30094 |
| | | | | 707/626 |
| 7,814,284 B1 | * | 10/2010 | Glass | H03M 7/30 |
| | | | | 704/258 |
| 7,966,495 B2 | * | 6/2011 | Ackerman | G06Q 20/3678 |
| | | | | 705/69 |
| 2004/0236803 A1 | | 11/2004 | Spiegeleer | |
| 2005/0262167 A1 | * | 11/2005 | Teodosiu | G06F 17/30286 |
| 2005/0283500 A1 | * | 12/2005 | Eshghi et al. | 707/200 |

(Continued)

OTHER PUBLICATIONS

Teodosiu et al. "Optimizing File Replication over Limited-Bandwidth Networks using Remote Differential Compression", 2006. Research Microsoft.*

(Continued)

*Primary Examiner* — Daniel Kuddus
(74) *Attorney, Agent, or Firm* — Gilliam IP PLLC

(57) ABSTRACT

A system and method obtain a set of data and identify successive subsets of data within the set of data. A boundary identifying hash is calculated on a subset of data and compared with a boundary indicating value. If the calculated boundary identifying hash matches the boundary indicating value, a natural boundary is identified in the set of data.

18 Claims, 5 Drawing Sheets

(56) References Cited

U.S. PATENT DOCUMENTS

| | | | |
|---|---|---|---|
| 2006/0085561 A1* | 4/2006 | Manasse | G06F 17/3015 |
| | | | 709/247 |
| 2006/0129610 A1* | 6/2006 | Agarwal et al. | 707/202 |
| 2006/0184652 A1* | 8/2006 | Teodosiu et al. | 709/221 |
| 2007/0018858 A1* | 1/2007 | McCanne | H03M 7/30 |
| | | | 341/50 |
| 2007/0022144 A1* | 1/2007 | Chen | G06F 11/2064 |
| 2007/0282924 A1* | 12/2007 | Kraegeloh | G06F 21/64 |
| 2008/0133561 A1* | 6/2008 | Dubnicki | G06F 11/1453 |
| 2008/0256365 A1* | 10/2008 | Eckleder | G06F 11/1004 |
| | | | 713/189 |
| 2009/0177721 A1 | 7/2009 | Mimatsu | |

OTHER PUBLICATIONS

"U.S. Appl. No. 12/130,548, Final Office Action mailed Feb. 9, 2012", 11 pgs.

U.S. Appl. No. 12/130,637, filed May 30, 2008, Combined Hash for Variable Data Chunks.

U.S. Appl. No. 12/130,548, filed May 30, 2008, File Change Detection.

U.S. Appl. No. 12/130,514, filed May 30, 2008, System and Method of Searching for Duplicate Data.

* cited by examiner

DATA BOUNDARY IDENTIFICATION

RELATED APPLICATIONS

This is a U.S. Patent Application that claims priority under 35 U.S.C. §119(e) to U.S. Provisional Patent Application titled "SYSTEM AND METHOD OF SEARCHING FOR DUPLICATE DATA," (Ser. No. 61/033,920) filed on Mar. 5, 2008 which is incorporated by reference in its entirety herein.

BACKGROUND

Data is very important to individuals and businesses. Many businesses regularly back up data stored on computer systems to avoid loss of data should a storage device or system fail or become damaged. One current data backup trend is to backup data to disks and use tapes for long term retention only. The amount of disk space needed to store a month's backup can be very large, such as around 70 terabytes in some examples. The amount of data will likely only be increasing going forward.

One strategy for backing up data involves trying to back up data that has changed, as opposed to all of the data, and then using prior backups of unchanged data to reconstruct the new backup. In one approach, data may be divided into fixed size blocks. An MD5 hash or a SHA256 hash may be calculated on the data belonging to the fixed size block of data, resulting in an MD5 signature for each block of data. The MD5 signature may be searched against an in memory database or an embedded database of previous MD5 signatures. In this approach any insertion of new data would cause blocks to shift and hence fixed size chunking and MD5 calculations on those fixed size chunks will not help.

The next time the file is backed up, signatures are generated for the blocks and searched against the database of signatures to find duplicates if any data has changed. Only the changed blocks need be saved during the backup.

SUMMARY

A method comprises obtaining a set of data, identifying successive subsets of data within the set of data, calculating a boundary identifying hash on a subset of data, comparing the calculated boundary identifying hash with a boundary indicating value, and if the calculated boundary identifying hash is equal to the boundary indicating value, identifying a natural boundary in the set of data.

In a further embodiment, a method comprises obtaining a set of data, identifying successive subsets of data within the set of data after a desired minimum data chunk length, calculating a boundary identifying hash on a subset of data, comparing the calculated boundary identifying hash with a boundary indicating value, if the calculated boundary identifying hash matches the boundary indicating value, identifying a natural boundary in the set of data, and if a maximum data chunk length is encountered prior to a match, identifying the natural boundary in the set of data at such maximum data chunk length.

In a further embodiment, a computer readable medium has instructions for causing a computer to execute a method of obtaining a set of data, identifying successive subsets of data within the set of data after a desired minimum data chunk length, calculating a boundary identifying hash on a subset of data, comparing the calculated boundary identifying hash with a boundary indicating value, if the calculated boundary identifying hash matches the boundary indicating value, identifying a natural boundary in the set of data, and if a maximum data chunk length is encountered prior to a match, identifying the natural boundary in the set of data at such maximum data chunk length.

In yet a further embodiment, a method comprises determining natural boundaries in data to be backed up to identify variable size chunks of data, calculating a hash for each variable size chunk of data, comparing the hash for each variable size chunk of data to a database of hashes to determine which chunks should be backed up, and storing such chunks to a backup medium.

In still a further embodiment, a system comprises a processor, a natural boundary identifier that identifies natural boundaries of a set of data as a function of a hash on successive subsets of the data, a chunk hash generator that calculates a hash on each chunk of data between natural boundaries, a database of prior hashes on chunks of data in the set of data, and a comparator that compares calculated hashes to prior hashes from the database to determine whether a chunk of data should be backed up.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In some prior backup systems, a hash is calculated on fixed length blocks of data. If data in a block changes, it may result in further blocks also changing, and corresponding changes in hashes. As a result, it becomes difficult to determine if data following the first block changed, resulting in backing up more data than may be really needed.

A hashing mechanism may be used to find some "special boundaries" on data. A hash, such as an MD5 hash is calculated on the data between those special boundaries. Such data is referred to as a chunk of data. In one embodiment, a full hash may then be created which consists of the MD5 hash, the size of the data chunk between the boundaries, and a weak hash of data around the special boundary.

The hashes may be stored in a desired format of a hash database. The next time the backups are done, the special boundaries are calculated on the data, resulting in many of the exact same chunks. The MD5 hash is calculated on the data chunks between the special boundaries along with the full hash on data between the special boundaries, and the hashes are compared against the hash database. If the hashes match, the data corresponding to the hash does not need to be stored again. In various embodiments, this may lead to huge savings on disk storage.

Figure 1:
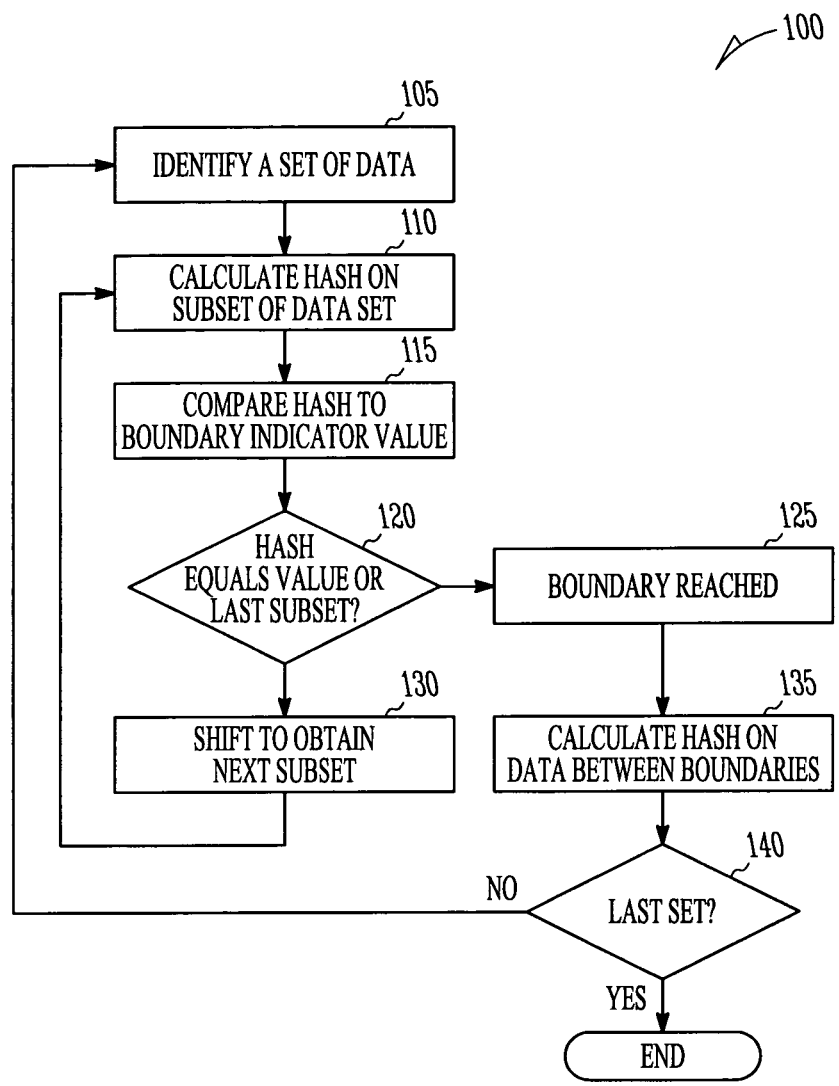
FIG. 1 is a flow chart illustrating a method of identifying natural boundaries in a set of data according to an example embodiment.
Figure 2:
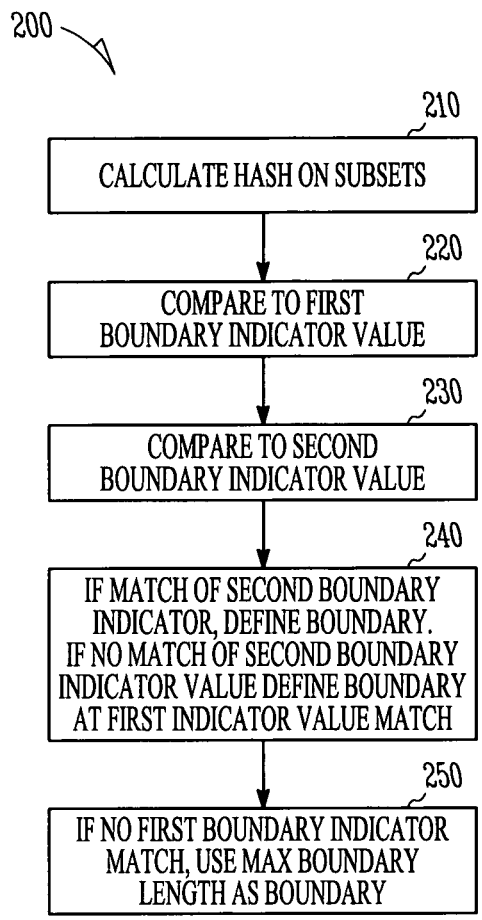
FIG. 2 is a flow chart illustrating an alternative method of identifying natural boundaries in a set of data according to an example embodiment.

In one embodiment of a method 100 of determining data boundaries is illustrated in FIG. 1, data to be backed up is first divided into sets of data and a set of data is identified at 105. The sets of data may start from the beginning of each file in the data to be backed up. In one embodiment, the sets of data are of fixed length, such as 64 KB, corresponding to the length of available buffer space to optimize processing. Sets may also be determined from the start of each file and may vary considerably in size, up to the entire data to be backed up.

Consider a data set as consisting of a string of characters: "AAA BBB CCC DDD EEE FFF GGG HHH III JJJ KKK LLL MMM NNN OOO PPP QQQ RRR SSS TTT UUU". A character may be a desired amount of data, such as one or more bits of data that may be used to identify characters, including one or more bytes of data in some embodiments. A character as used herein need not be limited to an amount corresponding to the amount used to represent an alphanumeric character.

In one embodiment, a special boundary determining hash is 32 characters in length. One such special boundary determining hash used may be an Adler hash. Such hash is first calculated on the first 16 characters at 110, referred to as a subset of the data set: "AAA BBB CCC DDD".

This calculated hash is then compared against a fixed boundary indicator value at 115. If the calculated hash equals boundary indicator value at 120, it is determined that a "natural boundary" in the data set has been reached as indicated at 125. If the calculated hash does NOT equal boundary indicator value, a next subset is found at 130 by shifting one character to the right in the data set. Control is returned to 110, where a new boundary determining hash of 32 characters is then calculated on the new subset: "AA BBB CCC DDD D".

The new boundary determining hash is then compared with the boundary indicator value at 115. The process of shifting the subset of data through the set of data and calculating and comparing the boundary determining hash with the boundary indicator value is repeated until the hash and value match. The point in the data set at which they match is the "natural boundary" for the chunk of data.

Assume for example that a natural boundary is found at the data subset of: "MM NNN OOO P". The first "chunk" is then determined to be: "AAA BBB CCC DDD EEE FFF GGG HHH III JJJ KKK LLL MMM NNN OOO P". This chunk is then fed to a module or device that performs an MD5 hash. An MD5 hash is calculated on the first chunk and stored in the hash database at 135.

The Adler hash is then calculated on the next subset of data, the 16 bits starting with: "PP QQQ RRR SSS T". If the last set has not been processed as indicated at 140, the process is repeated for all sets to determine all of the chunks in the data to be backed up. This results ing chunks that are of variable size, wherein the size is of each chunk is dictated by the Adler hash algorithm. Each chunk has a corresponding MD5 hash in the hash database. These calculations and the process may be performed at any time, including during a backup of the data. Since the Adler hash is likely to identify the same data boundaries as before, even a change at the beginning of the data should result in many identical chunks and corresponding hashes being found. This may significantly reduce the amount of data that is written to disk during a backup.

In one embodiment, between backups of data, portions of the data may be changed. In one simple example, data may be inserted into the above example data set, resulting in a new data set: "ZZZ AAA BBB CCC DDD EEE FFF GGG HHH III JJJ KKK LLL MMM NNN OOO PPP QQQ RRR SSS TTT UUU". Note that the characters "ZZZ" has been added to the beginning of the data set. The Adler hash algorithm is applied on 32 bit subsets of data from the data set until the hash equals the boundary indicator value.

It is possible that a "natural boundary" may or may not be found prior to the previous natural boundary. Encountering the natural boundary earlier depends on the data. However, the same natural boundary will be found again at "MM NNN OOO P", because this data has remained the same.

The MD5 hash is calculated from start of data set until the natural boundary "MM NNN OOO P". This MD5 hash will not match with the previous one because of the change in data from previous one. However, the characters following "MM NNN OOO P" would remain the same, and the MD5 hash will match from this point. This ensures that similarities in data are found even if some parts of the file have changed.

In one embodiment, it is desired that the hashes are on chunks of data having a size between 8K and 32 K. Processing characters to find a "natural boundary" may be started after 8K of a file or set of data. In this embodiment, each subset is identified at 110 and the boundary identifying hash is performed on subsets starting after 8K Thus processing is avoided in the first 8K of each resulting chunk of data. The 8K size may be referred to as a "minBoundaryLength". The minBoundaryLength may have different values in further embodiments, which may be dependent on the type of hash used and other desired efficiencies.

Processing continues as before with calculating a hash on 32 characters, checking the hash against a constant boundary indicator value. If it doesn't match, a window for the data subset is slid over by one character. Processing continues until the boundary indicator value is found.

If the boundary indicator value is not found by the time the sliding window defining the subset of data has reached 32K at 120, the corresponding 32K chunk is defined as the next chunk size, and an MD5 hash is calculated on the 32 K chunk. The 32 K size is called a "maxBoundaryLength", which may vary in further embodiments as desired.

In one embodiment, a method 200 may be varied from method 100 to reduce the chances of hitting "maxBoundaryLength" too often. At each position where a hash is calculated on a trailing 32 characters, the hash is compared with 2 different boundary indicating numbers at 220 and 230. A first boundary indicating number around 10K, and a second boundary indicating number around 20K.

Thus, the Adler hash is compared with two different boundary indicating values. A "natural boundary" may be hit at two different places by comparing against the two natural boundary values. Once the lower boundary position is hit, the algorithm continues processing characters hoping to hit a higher "natural boundary". If the natural boundary corresponding to the divisor 20K is not found, the natural boundary corresponding to the lower 10K divisor is considered at 240. In a worst case where neither boundary indicator value is found for the lower or higher divisors, 32 K is considered as the chunk at 250. In one embodiment, natural boundaries are found up to approximately 95% of the time.

Figure 3:
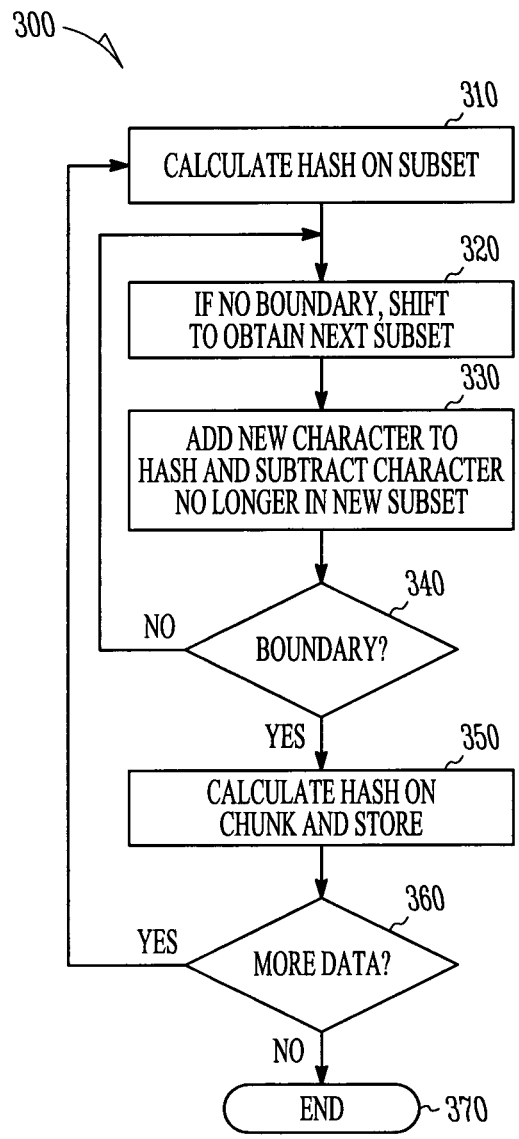
FIG. 3 is a flow chart illustrating a method of computing a rolling hash and generating hashes on chunks of data according to an example embodiment.

In yet a further embodiment, an efficient method 300 of calculating the Adler hash is illustrated in FIG. 3. As indicated above, while trying to find natural boundaries, a hash is calculated on subsets of 32 characters at 310, comparing against a boundary indicator value. And if the boundary indicator value is not hit, the entire process is performed again on a subset found by shifting one character at 320.

If there are N characters, the Adler hash is performed on N characters. At each successive character the hash of the trailing 32 characters is calculated. This would be very costly. In one embodiment, the Adler hashing algorithm is a rolling algorithm.

For example, consider the characters "ABCDEFGH". The hash is calculated as 'A'+'B'+ . . . +'H'. When calculating the hash by shifting one character, all characters do not need to be added again. In one embodiment, 'I' is added to the previous sum. Then 'A' is subtracted at 330. This results in a new hash for the next subset and is referred to as a rolling hash algorithm. If a boundary does not result at 340, 320 and 330 are repeated. If a boundary is found at 340, a hash on the resulting chunk of data is calculated at 350. At 360, if no more data is found, the process ends at 370. Otherwise, a new subset is determined following the last natural boundary at 310 and the method continues.

Hash on Chunks

A hash, such an MD5 hash may not be guaranteed to generate a different hash for different chunks of data. The probability of MD5 clashes is very low. But our objective is to reduce the probability of clashes even further. In one embodiment, the hash on the chunk has additional data added to it. The length of the data chunk over which the hash is created is also be included with the overall hash. The last boundary identifying hash for the data chunk is also be included. If all three match, it is assumed that the data chunk is also matching.

In one embodiment, an MD5 algorithm is used to create the hash on a data chunk. An MD5 hashing algorithm may be used to generate a 128-bit hash of a data set of any length. The hash generated by this algorithm depends on the content of the data and the length of the data. The hash generated by the MD5 algorithm may be very sensitive to any change in the content of the data and exhibits a relatively large change in the hash output even if there is a very small change in the data content. An MD5 hash function processes the data set sequentially to calculate the hash output. The length of data set affects the generated hash output. Whenever processing variable length data sets, such as the data chunks herein, in addition to the hash of the data, the length of data set may also be stored. In case of data sets of different length, the hash comparison of the data set alone may not be meaningful.

Figure 4:
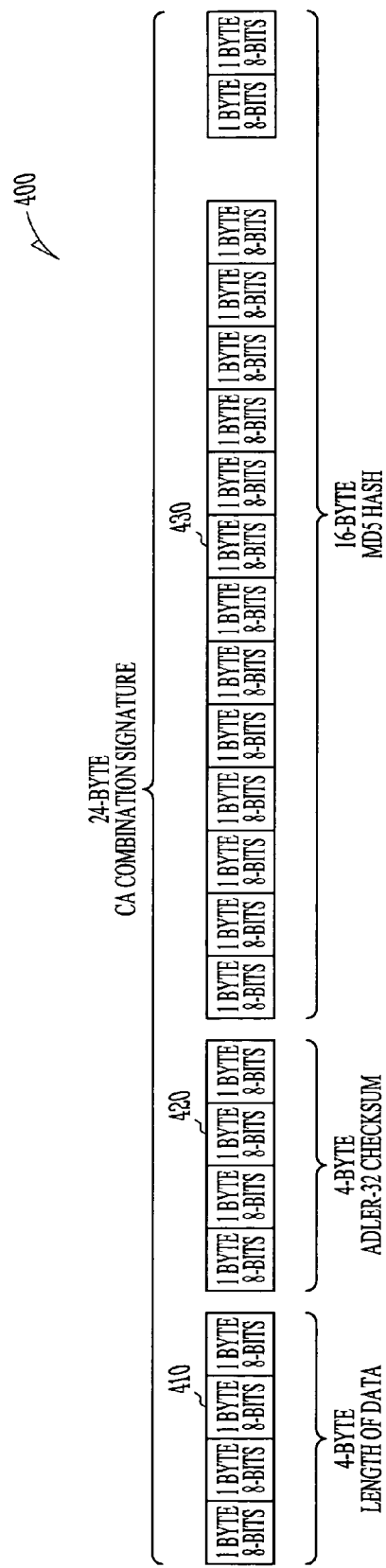
FIG. 4 is a block diagram of a signature according to an example embodiment.

In one embodiment, a combined signature 400 in FIG. 4 for each data chunk is generated. The combined signature 400 includes a 4-byte size 410 of the data chunk, a 4-byte checksum 420 for the data chunk, and a 16-byte MD5 hash 430 of the data chunk.

In one embodiment, signature 400 consists of not just the MD5 hash, but has the size of the Adler chunk, the Adler hash and the MD5 hash. This ensures that even if there is an MD5 clash, the chances of us getting affected because of MD5 clash is very low because not just the MD5 hash is being relied upon. Instead, the size of the Adler chunk and an Adler signature are being used, which themselves may dictate the size of the chunk that is used to calculate the MD5.

In one embodiment, the Adler hash of 32 bits for a selected subset of data, such as the last subset before a boundary was determined, may be used as the checksum function. The Adler 32 bit hash is sensitive to the contents of data chunk and relative positioning of bytes in the data set. The checksum may be computed with a very high speed making it very efficient for this purpose. Since the probability of finding two data chunks of the same length with matching MD5 hash and Adler-32 checksum is infinitesimally small, the possibility of collision in signatures is highly unlikely.

By combining all the three attributes (length, checksum, and hash) of a data chunk in a single signature, signatures of the data chunk may be determined and compared in a single compare operation at a very high speed. By using a combination signature as above, the possibility of collision vastly reduced if not eliminated without any significant impact on processing speed.

Figure 5:
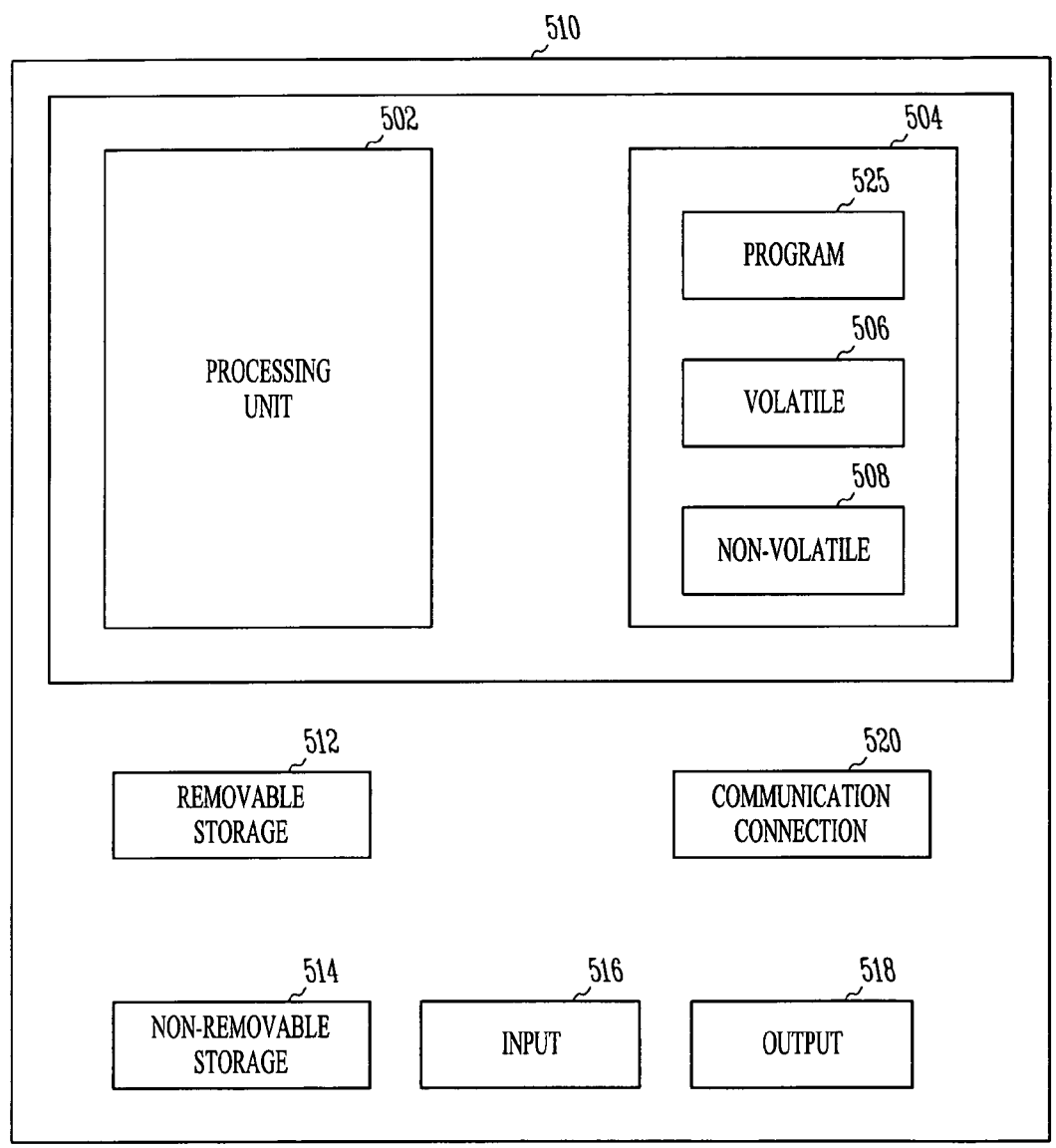
FIG. 5 is a block diagram illustrating an example computer system for executing methods associated with backing up data including identifying natural boundaries in a set of data according to an example embodiment.

A block diagram of a computer system that executes programming for performing the above methods is shown in FIG. 5. A general computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer-implemented method comprising:
   identifying chunk boundaries in a data set and determining variable size data chunks within the data set based, on identifying the chunk boundaries, wherein identifying each of the chunk boundaries comprises,
      calculating, with a first hash function that is a rolling hash function, boundary identifying hashes based on progressively shifting a window over the data set until either reaching a maximum chunk size or matching a first boundary indicating value;
      after calculating each of the boundary identifying hashes, comparing the boundary identifying hash with the first boundary indicating value to determine whether the boundary identifying hash matches;
      before shifting the window, determining whether a size of data within the window and trailing the window since a preceding chunk boundary is equal to the maximum chunk size to determine whether the maximum chunk size has been reached;
      wherein each of the variable size data chunks is determined when the maximum chunk size is reached or a corresponding one of the chunk boundaries is identified, wherein each of the variable size data chunk comprises data within the window and data trailing the window since a preceding chunk boundary when the maximum chunk size is reached or when the corresponding one of the chunk boundaries is identified;
   calculating hashes of each of the variable size data chunks using a second hash function that is different than the first hash function;
   determining ones of the variable size data chunks to back up based on the calculated hashes of the variable size data chunks; and
   backing up the determined ones of the variable size data chunks.

2. The computer-implemented method of claim 1, wherein the first hash function is an Adler hash function and the second hash function is a MD5 hash function.

3. The computer-implemented method of claim 1, wherein identifying each of the chunk boundaries further comprises:
   for determining each of the variable size data chunks, comparing the boundary identifying hashes corresponding to the variable size data chunk with a second boundary indicating value as well as the first boundary indicating value until matching at least one of the boundary indicating values, wherein identifying the chunk boundary corresponding to the variable size data chunk is based on the second boundary indicating value when none of the boundary identifying hashes corresponding to the variable size data chunk matches the first boundary indicating value but at least one matches the second boundary indicating value.

4. The computer-implemented method of claim 1 further comprising:
   for each variable size data chunk determined based on identifying a chunk boundary,
      calculating, with the first hash function, a hash of the size of the variable size data chunk; and
      forming a signature for the variable size data chunk with the hash of the size of the variable size data chunk, the boundary identifying hash that identified the chunk boundary of the variable size data chunk, and the hash of the variable size data chunk;
   wherein determining ones of the variable size data chunks to back up comprises comparing the formed signatures to signatures in a database and indicating the ones of the variable size data chunks for which no matching signature is found as the ones of the variable size data chunks to back up.

5. The computer-implemented method of claim 1, wherein the first hash function is weaker than the second hash function.

6. The computer-implemented method of claim 1, wherein a size of the window is at least an identified minimum chunk size.

7. The computer-implemented method of claim 6 further comprising starting the window within each data subset occurring after each identified chunk boundary or occurring at a beginning of the data set, instead of starting the window at the beginning, wherein the data subsets are each at least the identified minimum chunk size.

8. One or more non-transitory machine readable media comprising program instructions for data chunk boundary identification, the program instructions to:
   identify chunk boundaries in a data set and determine variable size data chunks within the data set based on identification of the chunk boundaries within the data set, wherein the program instructions to identify each of the chunk boundaries comprise program instructions to,
      calculate, with a first hash function that is a rolling hash function, boundary identifying hashes based on progressively shifting a window over the data set until either reaching a maximum chunk size or matching a first boundary indicating value;
      after calculation of each boundary identifying hash, compare the boundary identifying hash with the first boundary indicating value to determine whether the boundary identifying hash matches;
      before shift of the window, determine whether a size of data within the window and trailing the window since a preceding chunk boundary is equal to the maximum chunk size to determine whether the maximum chunk size has been reached;
      wherein each of the variable size data chunks is determined when the maximum chunk size is reached or a corresponding one of the chunk boundaries is identified, wherein each of the variable size data chunk comprises data within the window and data trailing the window since a preceding chunk boundary when the maximum chunk size is reached or the corresponding one of the chunk boundaries is identified;
   calculate hashes of each of the variable size data chunks using a second hash function that is different than the first hash function;
   determine ones of the variable size data chunks to back up based on the calculated hashes of the variable size data chunks; and back up the determined ones of the variable size data chunks.

9. The non-transitory machine readable media of claim 8, wherein the program instructions to identify each of the chunk boundaries comprises program instructions to:
  for the determination of each of the variable size data chunks, compare the boundary identifying hashes corresponding to the variable size data chunk with a second boundary indicating value as well as the first boundary indicating value until matching at least one of the boundary indicating values, wherein identification of the chunk boundary corresponding to the variable size data chunk is based on the second boundary indicating value when none of the boundary identifying hashes corresponding to the variable size data chunk matches the first boundary indicating value but at least one matches the second boundary indicating value.

10. The non-transitory machine readable media of claim 8 further comprising program instructions to:
  for each variable size data chunk determined based on identifying a chunk boundary,
    calculate, with the first hash function, a hash of the size of the variable size data chunk; and
    form a signature for the variable size data chunk with the hash of the size of the variable size data chunk, the boundary identifying hash that identified the chunk boundary of the variable size data chunk, and the hash of the variable size data chunk;
    wherein the program instructions to determine ones of the variable size data chunks to back up comprises program instructions to compare the formed signatures to signatures in a database, and indicate the ones of the variable size data chunks for which no matching signature is found as the ones of the variable size data chunks to back up.

11. The non-transitory machine readable media of claim 8, wherein the first hash function is weaker than the second hash function.

12. The non-transitory machine readable media of claim 8, wherein a size of the window is at least an identified minimum chunk size.

13. The non-transitory machine readable media of claim 12 further comprising program instructions to start the window within each data subset occurring after each identified chunk boundary or occurring at a beginning of the data set, instead of starting the window at the beginning, wherein the data subsets are each at least the identified minimum chunk size.

14. An apparatus comprising:
  a processor; and
  a machine-readable medium comprising program instructions executable by the processor to cause the processor to,
  identify chunk boundaries in a data set and determine variable size data chunks within the data set based on identification of the chunk boundaries within the data set, wherein the program instructions to identify each of the chunk boundaries comprise program instructions to,
    calculate, with a first hash function that is a rolling hash function, boundary identifying hashes based on progressively shifting a window over the data set until either reaching a maximum chunk size or matching a first boundary indicating value;
    after calculation of each boundary identifying hash, compare the boundary identifying hash with the first boundary indicating value to determine whether the boundary identifying hash matches;
    before shift of the window, determine whether the maximum chunk size has been reached;
    wherein each of the variable size data chunks is determined when the maximum chunk size is reached or a corresponding one of the chunk boundaries is identified, wherein each variable size data chunk comprises data within the window and data trailing the window since a preceding chunk boundary when the maximum chunk size is reached or when the corresponding one of the chunk boundaries is identified;
  calculate hashes of each of the variable size data chunks using a second hash function that is different than the first hash function;
  determine ones of the variable size data chunks to back up based on the calculated hashes of the variable size data chunks; and
  back up the determined ones of the variable size data chunks.

15. The apparatus of claim 14, wherein the program instructions to identify each of the chunk boundaries further comprises program instructions executable by the processor to cause the processor to:
  for the determination of each of the variable size data chunks, compare the boundary identifying hashes corresponding to the variable size data chunk with a second boundary indicating value as well as the first boundary indicating value until matching at least one of the boundary indicating values, wherein identification of the chunk boundary corresponding to the variable size data chunk is based on the second boundary indicating value when none of the boundary identifying hashes corresponding to the variable size data chunk matches the first boundary indicating value but at least one matches the second boundary indicating value.

16. The apparatus of claim 14, wherein the machine-readable medium further comprises program instructions executable by the processor to cause the processor to:
  for each variable size data chunk determined based on identifying a chunk boundary,
    calculate, with the first hash function, a hash of the size of the variable size data chunk; and
    form a signature for the variable size data chunk with the hash of the size of the variable size data chunk, the boundary identifying hash that identified the chunk boundary of the variable size data chunk, and the hash of the variable size data chunk;
    wherein the program instructions to determine ones of the variable size data chunks to back up comprise program instructions to compare the formed signatures to signatures in a database, and indicate the ones of the variable size data chunks for which no matching signature is found as the ones of the variable size data chunks to back up.

17. The apparatus of claim 14, wherein the first hash function is weaker than the second hash function.

18. The apparatus of claim 14, wherein the machine-readable medium further comprises program instructions executable by the processor to cause the processor to start the window within each data subset occurring after each identified chunk boundary or occurring at a beginning of the data set instead of starting the window at the beginning, wherein each data subset is at least the specified minimum chunk size.

* * * * *